United States Patent [19]

Gupta

[11] Patent Number: 4,857,601
[45] Date of Patent: * Aug. 15, 1989

[54] SELECTIVE HYDROLYSIS OF COPOLYMERS OF PARA-ACETOXY STYRENE AND DIALKYL MUCONATES OR ALKYL SORBATES

[75] Inventor: Balaram Gupta, North Plainfield, N.J.

[73] Assignee: Hoechst Celanese Corp., Somerville, N.J.

[*] Notice: The portion of the term of this patent subsequent to Aug. 25, 2004 has been disclaimed.

[21] Appl. No.: 99,429

[22] Filed: Sep. 11, 1987

[51] Int. Cl.$^4$ ................................................ C08F 8/12
[52] U.S. Cl. ................................. 525/344; 525/328.9; 525/353; 525/355; 525/366; 525/369; 525/378
[58] Field of Search ............... 525/378, 344, 353, 355, 525/366, 369

[56] References Cited

U.S. PATENT DOCUMENTS 4,689,371 8/1987 Elmore et al. .................... 525/329.5
4,775,730 9/1988 Gupta ................................. 525/378

*Primary Examiner*—Joseph L. Schofer
*Assistant Examiner*—Bernard Lipman
*Attorney, Agent, or Firm*—Lynch, Cox, Gilman & Mahan

[57] ABSTRACT

Copolymers of p-acetoxystyrene and dialkyl muconates or alkyl sorbates are selectively hydrolyzed to copolymers of p-vinylphenol and dialkyl muconates or alkyl sorbates using acid or base catalysis in an alcohol or water.

18 Claims, No Drawings

SELECTIVE HYDROLYSIS OF COPOLYMERS OF PARA-ACETOXY STYRENE AND DIALKYL MUCONATES OR ALKYL SORBATES

BACKGROUND OF THE INVENTION

The field of art to which this invention pertains is copolymers of vinylphenol.

Homopolymers and copolymers of 4-hydroxystyrene, or p-vinylphenol as it is also called, are known compositions which have many uses, such as in the manufacture of metal treatment compositions and photoresists. Polymers of p-vinylphenol can be made by polymerizing p-vinylphenol itself. However, p-vinylphenol is an unstable compound and must be refrigerated to prevent it from polymerizing spontaneously. Even under refrigeration, the monomer will slowly polymerize to low molecular weight polymers. 4-Acetoxystyrene, the acetic acid ester of p-vinylphenol, is a stable monomer which can be readily homopolymerized and copolymerized to low, medium and high molecular weight polymers. After polymerization, the phenolic ester group can be hydrolyzed to produce p-vinylphenol polymers.

Corson et. al., Journal of Organic Chemistry, 23, 544-549 (1958), describe a 5 step process for making p-vinylphenol from phenol. The phenol is first acetylated to p-hydroxyacetophenone which is then acetylated to p-acetoxyacetophenone. This compound is hydrogenated to p-acetoxyphenylmethyl carbinol which is then dehydrated to p-acetoxystyrene. The p-acetoxystyrene is saponified to p-vinylphenol using potassium hydroxide. Packham, in the Journal of the Chemical Society, 1964, 2617-2624, describes the hydrolysis of crosslinked poly-4-hydroxystyrene by refluxing the polymer in alkaline aqueous dioxane for 2 days. In U.S. Pat. No. 4,544,704, a copolymer of styrene and p-isopropenylphenylacetate is hydrolyzed with aqueous sodium hydroxide in methanol and toluene using a small amount of benzyltrimethyammonium chloride as a phase transfer agent. Arshady et. al., Journal of Polymer Science, 12, 2017-2025 (1974), hydrolyzed copolymers of styrene and acetoxystyrene to the vinylphenol polymer usin9 hydrazine hydrate in dioxane.

The ester interchange reaction of poly (4-acetoxystyrene) in methanol using sodium methylate is described in U.S. Pat. No. 2,276,138. It is also stated in the patent that resinous polymers are obtained by the treatment of monomeric 4-acetoxystyrene with potassium hydroxide in methanol both cold and hot and with methanol using sulfuric acid as the ester interchange catalyst.

In copending patent application, Serial No. 22,186, filed Mar. 5, 1987, homopolymers and copolymers of p-acetoxystyrene are hydrolyzed to homopolymers and copolymers of p-vinylphenol by acid catalyzed transesterification in alcohols.

In copending patent application, Serial No. 29108, filed Mar. 23, 1987 (now U.S. Pat. No. 4,775,730) copolymers of p-acetoxystyrene and dialkyl muconates are described.

SUMMARY OF THE INVENTION

This invention pertains to a process for selectively hydrolyzing copolymers of p-acetoxystyrene and dialkylmuconates or alkyl sorbates to copolymers of p-vinylphenol and dialkylmuconates or alkyl sorbates. In one aspect, the invention relates to an acid catalyzed selective hydrolysis process. In another aspect, the invention pertains to a base catalyzed selective hydrolysis process.

By the process of this invention, copolymers of p-acetoxystyrene and dialkylmuconates or alkyl sorbates are slurried in an alcohol or aqueous base and are hydrolyzed to copolymers of p-vinylphenol and dialkylmuconates or alkyl sorbates at a temperature of about 20° C. to about 100° C. in the presence of an acid or a base for a time sufficient to hydrolyze the acetoxy groups to phenolic groups as indicated by dissolution of the copolymer in the alcohol or aqueous base. The resulting copolymers can be used as a vinylphenol copolymer without interfering reactions with carboxylic acid groups since the muconate ester groups are not hydrolyzed.

DESCRIPTION OF THE INVENTION

The dialkyl muconates which are used in preparing copolymers utilized in this invention are diester derivatives of muconic acid. Muconic acid is a diolefinically unsaturated adipic acid derivative and can be made by the microbiological oxidation of various hydrocarbon substrates, as described in U.S. Pat. Nos. 4,480,04 and 4,535,059. The dialkyl muconates used in this invention contain 1 to 4 carbon atoms in each alkyl group and are made by the direct esterification of muconic acid with methanol, ethanol, the propanols, or the butanols. The preferred dialkyl muconates useful in this invention are dimethyl muconate and diethyl muconate.

The alkyl sorbates which are used in preparing copolymers reacted in this invention are ester derivatives of sorbic acid. Sorbic acid, or hexadienoic acid, is a diolefinically unsaturated acid which can be made by the ring opening of the beta-lactone made from crotonaldehyde and ketene. The alkyl sorbates used in this invention contain 1 to 4 carbon atoms in each alkyl group and can be made by the direct esterification of sorbic acid with methanol, ethanol, the propanols, or the butanols. The preferred alkyl sorbates useful in this invention are methyl sorbate and ethyl sorbate.

The p-acetoxystyrene components of the copolymers used in this invention can be made by the process described in Corson et. al. *Journal of Organic Chemistry* 23, 544-549 (1958). As described in this article, phenol is acetylated to p-hydroxyacetophenone which is then acetylated to p-acetoxyacetophenone. This compound is then hydrogenated to p-acetoxyphenylmethylcarbinol, which is then dehydrated to p-acetoxystyrene.

The copolymers which are reacted in this invention are prepared by the free radical polymerization of p-acetoxystyrene and the dialkyl muconate or alkyl sorbate in solution, emulsion, or suspension using well known polymerization techniques. The copolymers will contain about 10 to about 90 weight percent p-acetoxystyrene to about 90 to about 10 weight percent dialkyl muconate or alkyl sorbate.

In carrying out the process of this invention, the 4-acetoxystyrene-dialkyl muconate or alkyl sorbate copolymer is slurried in alcohol or aqueous base in the amount of about 5 percent by weight of polymer up to about 40 percent by weight of polymer in the alcohol or aqueous base wherein the percentages are based on the total weight of polymer and alcohol or aqueous base. The slurry is stirred and the catalyst is added. Heating at about 20° C. to about 100° C. is continued until the polymer dissolves in the alcohol or aqueous base indicating complete conversion of the acetoxy groups to phenolic groups Generally, this heating period will vary from about 1 hour to about 20 hours. When solution is obtained indicating the completion of the hydrolysis of acetoxy groups to phenolic groups, the copolymer is recovered by means well known to those skilled in the art. If the hydrolysis reaction is conducted in aqueous base, the polymer can be recovered from solution by precipitation with acid. If the reaction is an alcoholysis reaction in alcohol, the polymer can be recovered by precipitating and coagulating the polymer in water.

Alcohols useful in this invention are the one to four carbon alcohols, i.e., methanol, ethanol, the propanols and the butanols. The preferred alcohols are methanol and ethanol with methanol being most preferred.

Acids useful in this invention are mineral acids and organic acids which have dissociation constants in aqueous solutions, i.e., $pK_a$, of less than 2 and, preferably, less than 1. Examples of such acids include hydrochloric acid, sulfuric acid, phosphoric acid, methanesulfonic acid, p-toluene sulfonic acid, benzyl sulfonic acid, dichloroacetic acid, trichloroacetic acid, iodic acid, boron trifluoride, aluminum chloride, stannic chloride and the like. The amounts of acid used in the process of this invention are catalytic amounts, i.e., about 1 percent by weight based on the weight of 4-acetoxystyrene polymer up to about 40 percent by weight.

Bases used in this invention are the alkali metal hydroxides and alkoxides, preferably sodium methoxide, ammonium hydroxide and quaternary ammonium hydroxides, such as tetramethylammonium hydroxide, ethyltrimethylammonium hydroxide, diethyldimethylammonium hydroxide, triethylmethylammonium hydroxide, tetraethylammonium hydroxide, benzyltrimethylammonium hydroxide and choline. The bases are used in amounts which are at least about equivalent to acetoxy groups in the copolymer. Large excesses of base can also be used.

Surprisingly the acid or base hydrolysis of the acetoxy groups in copolymers of p-acetoxystyrene and dialkylmuconates or alkyl sorbates can be conducted with little or no saponification of the ester groups of the dialkyl muconate or alkyl sorbate moiety. The absence of carboxylic acids groups in the copolymer enables reactions to be conducted with the phenolic groups with no interference. For example, esterification reactions with added acids, e.g., acrylic acid, and the phenolic groups can be conducted without crosslinking which could occur if muconic acid or sorbic acid groups were present in the copolymer.

The hydrolyzed copolymers of this invention can be used to make phosphated coatings for metal treatment and in radiation curable coatings compositions. The copolymers are useful as positive acting photoresist materials, as deep ultra-violet resist materials and in image reversal type positive resist formulations. Additional uses are as polymer modifiers and polymer compatibilizers.

The following examples describe the invention in more detail. Parts and percentages unless otherwise indicated are parts and percentages by weight.

EXAMPLE A

A mixture of 90 ml. of p-acetoxystyrene (0.65 mole), 90 ml. of toluene and 1.26 grams of 2,2'-azobis(2,4-dimethylvaleronitrile) is degassed by three freeze-pump-thaw cycles. To this mixture is added 18 grams of dimethyl muconate (0.106 mole) at once with thorough stirring. The mixture is then heated to 70° C. to 80° C. under argon with stirring for 20 hours, during which time a white translucent syrup forms. The syrup is dissolved in 500 ml. acetone and suction filtered to remove any insoluble impurities. The clear polymer solution is then coagulated with 14 liters of methanol and acidified with 10 ml. of dilute hydrochloric acid to obtain a white granular polymer. After filtration and drying, 111.6 grams of the powder are recovered. The degree of conversion is 91 percent. Based on elemental analysis and proton NMR analysis, the composition of the polymer is found to be p-acetoxystyrene (ASM) and dimethylmuconate (MMu) in a molar ratio of 4 to 1. The Tg of the polymer is 106.5° C. and the thermal decomposition onset is 260° C. under nitrogen atmosphere. The weight average molecular weight ($M_w$) is 57,650 and the number average molecular weight (Mn) is 33,300.

EXAMPLE 1

To a suitable reactor are added 5 parts of an ASM-MMu copolymer having a molar ratio of ASM:MMu of 70:30 and 100 parts by volume of 20 percent aqueous tetramethyl ammonium hydroxide. The resulting slurry is heated at reflux temperature for one hour, at which time the polymer is dissolved. The solution is acidified to a pH of 3 with concentrated hydrochloric acid to precipitate a white granular polymer. After filtering and drying, 3.5 parts of polymer are recovered. Elemental analysis shows the product to be a copolymer of p-vinylphenol and dimethylmuconate plus one mole of water for each molar equivalent of p-vinylphenol.

EXAMPLE 2

To a suitable reactor are added 50 parts by volume of methanol and 0.5 part by volume of methanesulfonic acid. A copolymer, 5 parts, of ASM and MMu in a molar ratio of 80:20 is then added forming a suspension. The suspension is stirred at room temperature until the suspended polymer is completely dissolved, a period of 3 hours and 15 minutes. Water is added to coagulate the polymer. 3.57 parts of polymer are recovered after filtering and drying.

Elemental analysis indicates that the polymer is a copolymer of p-vinylphenol and dimethylmuconate in a molar ratio of 80:20 plus a half mole of combined water. The copolymer has a Tg of 147° C. and molecular weight of 62,750 ($M_w$) and 29,200 ($M_n$).

EXAMPLE 3

To a suitable reactor are added 50 parts by volume of methanol and 50 meq. of sodium metal under nitrogen. After the sodium has reacted to form sodium methoxide, 2 parts of a copolymer of ASM and MMu (80:20 molar ratio) are added. The resulting slurry is stirred overnight, 18 hours, at room temperature. At the end of this period, a clear solution has formed. The solution is added to 200 parts of water acidified with 1 part by volume of methane sulfonic acid to coagulate the polymer. After filtering, washing and drying in a vacuum oven at 40° C., 1.4 parts of a p-vinylphenol-dimethyl muconate polymer is recovered.

EXAMPLE 4

To a suitable reactor are added 50 parts by volume of methanol, 2 parts of a copolymer of ASM and MMu (80:20 molar ratio) and 2 parts by volume of $BF_3$ etherate. After stirring overnight, the resulting clear solution is coagulated in 200 parts of water. After filtering, washing and drying, 1.62 parts of a p-vinylphenol-dimethyl muconate copolymer are recovered.

EXAMPLE 5

To a suitable reactor are added 25 parts by volume of ammonium hydroxide (28 percent ammonia) and 2 parts of a copolymer of ASM and MMu (80:20 molar ratio). Stirring is begun and heat is applied raising the temperature to reflux. Heating at reflux is continued for 17 hours. At the end of this heating period, the resulting clear solution is filtered, acidified to pH 4 with concentrated hydrochloric acid. After filtering, washing with acidified water and drying, 1.57 parts of a p-vinylphenol-dimethyl muconate copolymer are recovered.

EXAMPLE 6

To a suitable reactor are added 50 parts by volume of ethanol, 2 parts of an ASM:MMu copolymer (80:20 molar ratio) and 0.5 part by volume of methanesulfonic acid. Stirring is begun and heat is applied raising the temperature to 70° C. After heating for 50 minutes at 70° C., the resulting clear solutio is coagulated with 300 parts of water. After filtering, washing and drying, 1.51 parts of a p-vinylphenol, dimethylmuconate copolymer are recovered.

EXAMPLE 7

To a suitable reactor are added 500 parts by volume of methanol, 3 parts by volume of methanesulfonic acid and 50 parts of a copolymer of ASM and MMu (90:10 molar ratio). The reactants are stirred at room temperature for 17 hours. The resulting clear solution is filtered and coagulated in 11,200 parts of water. After filtering, washing with 8400 parts of water and drying, 39.3 parts of polymer are recovered. Elemental analysis of the polymer shows it to be a copolymer of p-vinylphenol and dimethylmuconate in a molar ratio of 90:10 plus 1/2 mole of combined water. The polymer has a Tg of 151° C., and molecular weight of 30,600 ($M_2$) and 18,750 ($M_n$).

EXAMPLE 8

To a suitable reactor are added 50 parts by volume of methanol, 0.5 part by volume of methanesulfonic acid and 5 parts of an ASM:MMu copolymer (80:20 molar ratio). After stirring 3 hours at room temperature, the resulting clear solution is coagulated in 500 parts of water, filtered and dried under vacuum at 50° C. The resulting p-vinylphenol-dimethylmuconate copolymer (3.93 parts) has a Tg 151.5° C. and molecular weight of 33,000 ($M_2$) and 20,100 ($M_n$).

EXAMPLE 9

To a suitable reactor are added 50 parts by volume of methanol, 0.5 part of methanesulfonic acid and 5 parts of an ASM:MMu copolymer (90:10 molar). After 3 hours at room temperature, coagulation in water, filtering, washing and drying, 3.82 parts of p-vinylphenol-dimethylmuconate copolymer are recovered. The copolymer has a Tg of 162.5° C., and molecular weight of 27,550 ($M_2$) and 18,750 ($M_n$).

EXAMPLE 10

A copolymer of ASM:MMu (80:20 molar ratio) is reacted in methanol with methanesulfonic acid at room temperature for 5 hours. The resulting p-vinylphenol-dimethylmuconate copolymer has a Tg of 147.5° C. and molecular weight of 44,750 ($M_2$) and 27,150 ($M_n$).

EXAMPLE 11

Another copolymer of ASM:MMu (80:20 molar ratio), after reacting in methanol with methanesulfonic acid for 4 hours at room temperature, is hydrolyzed to a p-vinylphenol-dimethylmuconate copolymer having a Tg of 154.5° C. and molecular weight of 113,400 ($M_2$) and 56,700 ($M_n$).

EXAMPLE 12

To a suitable reactor are added 50 parts of an 80/20 molar copolymer of p-acetoxystyrene and methyl sorbate, 250 parts by volume of methanol and 1.5 parts by volume of methanesulfonic acid. Inert gas purge is begun and the polymer slurry is stirred at room temperature until solution is obtained, a total of 22 hours. After filtering, the solution is coagulated in 5000 parts of water and is washed with 2000 parts of water. After filtering to remove the water, the polymer is dried in darkness under vacuum at 40° C. Analysis shows the polymer to be a copolymer of p-vinylphenol and methyl sorbate.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed is:

1. A process for preparing copolymers of p-vinylphenol and dialkyl muconates or alkyl sorbates which comprises slurrying copolymers of p-acetoxystyrene and dialkyl muconates or alkyl sorbates in water or an alcohol followed by hydrolyzing the acetoxy groups with an acid or a base with substantially no saponification of the alkyl muconate or alkyl sorbate groups.

2. The process of claim 1 wherein the hydrolysis reaction is conducted at a temperature of about 20° C. to about 100° C.

3. The process of claim 1 wherein the copolymer contains about 10 to about 90 weight percent p-acetoxystyrene and about 90 to about 10 weight percent dialkylmuconate.

4. The process of claim 3 wherein the alkyl groups of the dialkyl muconate contain 1 to 4 carbon atoms.

5. The process of claim 4 wherein the alkyl groups are methyl groups.

6. The process of claim 1 wherein the copolymer contains about 10 to about 90 weight p-acetoxystyrene and about 90 to about 10 weight percent alkyl sorbate.

7. The process of claim 6 wherein the alkyl groups of the alkyl sorbate contain 1 to 4 carbon atoms.

8. The process of claim 7 wherein the alkyl groups are methyl groups.

9. The process of claim 1 wherein the hydrolysis is conducted with an acid.

10. The process of claim 9 wherein the acid has a $Pk_a$ of less than 2.

11. The process of claim 9 wherein the acid is hydrochloric acid.

12. The process of claim 9 wherein the acid is sulfuric acid.

13. The process of claim 9 wherein the acid is methanesulfonic acid.

14. The process of claim 1 wherein the hydrolysis is conducted with a base.

15. The process of claim 14 wherein the base is a quaternary ammonium hydroxide.

16. The process of claim 14 wherein the base is an alkali metal hydroxide or alkoxide.

17. The process of claim 16 wherein the base is sodium methoxide.

18. The process of claim 14 wherein the base is ammonium hydroxide.

* * * * *